United States Patent
Gao et al.

(10) Patent No.: US 12,389,368 B2
(45) Date of Patent: Aug. 12, 2025

(54) ADJUST PAGING OCCASION TO RESOLVE PAGING COLLISION AT A MULTI-SIM DEVICE

(71) Applicant: Apple Inc., Cupertino, CA (US)

(72) Inventors: Jishan Gao, Beijing (CN); Lijie Zhang, Beijing (CN); Haijing Hu, Los Gatos, CA (US); Zhiwei Wang, Beijing (CN); Qiang Miao, Beijing (CN)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 17/755,728

(22) PCT Filed: Nov. 28, 2019

(86) PCT No.: PCT/CN2019/121552
§ 371 (c)(1),
(2) Date: May 6, 2022

(87) PCT Pub. No.: WO2021/102786
PCT Pub. Date: Jun. 3, 2021

(65) Prior Publication Data
US 2022/0394666 A1    Dec. 8, 2022

(51) Int. Cl.
*H04W 68/02*    (2009.01)
*H04W 60/00*    (2009.01)
(Continued)

(52) U.S. Cl.
CPC ......... *H04W 68/02* (2013.01); *H04W 60/005* (2013.01); *H04W 68/005* (2013.01); *H04W 74/0825* (2013.01); *H04W 76/15* (2018.02)

(58) Field of Classification Search
None
See application file for complete search history.

(56) References Cited

U.S. PATENT DOCUMENTS

2009/0215472 A1    8/2009  Hsu
2014/0128082 A1    5/2014  Chirayl
(Continued)

FOREIGN PATENT DOCUMENTS

CN    103139387    6/2013
CN    104126325    10/2014
(Continued)

OTHER PUBLICATIONS

Oppo, "Solution for Key Issue#2 Paging collision avoidance", SA WG2 Meeting #136, S2-1911208, Nov. 22, 2019, 4 sheets.
(Continued)

*Primary Examiner* — Saumit Shah
(74) *Attorney, Agent, or Firm* — Fay Kaplun & Marcin, LLP

(57) ABSTRACT

A user equipment (UE) includes a first subscriber identification module (SIM) and a second SIM. The UE is configured to establish a first cellular network connection based on, at least, the first SIM and a second cellular network connection based on, at least, the second SIM. The UE detects a collision between i) multiple paging occasions or ii) multiple paging frames. The UE then initiates a procedure for updating a paging occasion for the first cellular network connection. The UE monitors for a page over the first cellular network connection during the paging occasion.

14 Claims, 4 Drawing Sheets

(51) Int. Cl.
*H04W 68/00* (2009.01)
*H04W 74/0808* (2024.01)
*H04W 76/15* (2018.01)

(56) References Cited

U.S. PATENT DOCUMENTS

| | | | |
|---|---|---|---|
| 2017/0094628 A1 | 3/2017 | Miao et al. | |
| 2017/0359772 A1 | 12/2017 | Lee | |
| 2018/0343638 A1 | 11/2018 | Balasubramanian et al. | |
| 2018/0368099 A1 | 12/2018 | Chen et al. | |
| 2022/0030548 A1* | 1/2022 | Chun | H04W 8/183 |
| 2022/0240213 A1* | 7/2022 | Ly | H04W 60/04 |
| 2022/0248369 A1* | 8/2022 | Wu | H04W 68/02 |
| 2022/0256501 A1* | 8/2022 | Peng | H04W 68/02 |
| 2022/0287003 A1* | 9/2022 | Shimoda | H04W 56/001 |
| 2023/0189209 A1* | 6/2023 | Jung | H04W 48/12 370/329 |

FOREIGN PATENT DOCUMENTS

| | | |
|---|---|---|
| CN | 106465464 | 2/2017 |
| CN | 107509201 | 12/2017 |
| EP | 3742831 | 11/2020 |
| WO | 2020/124057 | 6/2020 |
| WO | 2020/238127 | 12/2020 |
| WO | 2020/247043 | 12/2020 |

OTHER PUBLICATIONS

Qualcomm Incorporated et al., "Solution for Paging collision avoidance", SA WG2 Meeting #136, S2-1912399, Nov. 22, 2019, 7 sheets.

Sony, "Solution KI#2: UE suggested UE_ID for paging", 3GPP SA WG2 Meeting #136, S2-1911143, Nov. 8, 2019, 5 sheets.

* cited by examiner

ADJUST PAGING OCCASION TO RESOLVE PAGING COLLISION AT A MULTI-SIM DEVICE

BACKGROUND

A user equipment (UE) may be equipped with multiple subscriber identification modules (SIMs) and each SIM may enable the UE to establish an independent network connection. Thus, a multi-SIM UE may establish a first network connection using a first SIM and a second network connection using a second SIM.

The multi-SIM UE may be equipped with limited resources and thus, performing an operation related to one of the network connections may cause the multi-SIM UE to be unable to perform an operation related to the other network connection. For instance, the multi-SIM UE may be configured with paging occasions that overlap in time. The multi-SIM UE may be unable to monitor both paging occasions at the same time. As a result, the multi-SIM UE may miss a page sent over one of the network connections. This may interfere with network services and cause a poor user experience.

SUMMARY

According to an exemplary embodiment, a method is performed by a user equipment (UE) comprising a first subscriber identification module (SIM) and a second SIM. The UE is configured to establish a first cellular network connection based on, at least, the first SIM and a second cellular network connection based on, at least, the second SIM. The method comprises detecting a collision between i) multiple paging occasions or ii) multiple paging frames. The method further comprises, selecting a value for a parameter that is to be used by a network to determine a paging occasion for the first cellular network connection. The method further comprises transmitting a signal to the network, the signal indicating the value for the parameter. The method further comprises monitoring for a page over the first cellular network connection during the paging occasion.

Further exemplary embodiments include a user equipment (UE) having a first subscriber identification module (SIM) and a second SIM. The UE also includes a transceiver configured to establish a first cellular network connection based on, at least, the first SIM and a second cellular network connection based on, at least, the second SIM. The UE also includes a processor configured to perform operations. The operations comprising detecting a collision between i) multiple paging occasions or ii) multiple paging frames. The operations further comprising selecting a value for a parameter that is to be used by a network to determine a paging occasion for the first cellular network connection. The operations further comprising transmitting a signal to the network, the signal indicating the value for the parameter. The operations further comprising monitoring for a page over the first cellular network connection during the paging occasion.

Still further exemplary embodiments, a method is performed by a user equipment (UE) comprising a first subscriber identification module (SIM) and a second SIM. The UE is configured to establish a first cellular network connection based on, at least, the first SIM and a second cellular network connection based on, at least, the second SIM. The method comprises, detecting a collision between i) multiple paging occasions or ii) multiple paging frames. The method further comprises, initiating a procedure with a network corresponding to the first cellular network connection in response to detecting the collision, wherein the procedure includes the network configuring the UE with a temporary identifier. The method further comprises, monitoring for a page over the first cellular network connection during a paging occasion, the paging occasion configured by the network using the temporary identifier.

Additional exemplary embodiments include a user equipment (UE) having a first subscriber identification module (SIM) and a second SIM. The UE also includes a transceiver configured to establish a first cellular network connection based on, at least, the first SIM and a second cellular network connection based on, at least, the second SIM. The UE also includes a processor configured to perform operations. The operations comprising, detecting a collision between i) multiple paging occasions or ii) multiple paging frames. The operations further comprising, initiating a procedure with a network corresponding to the first cellular network connection in response to detecting the collision, wherein the procedure includes the network configuring the UE with a temporary identifier. The operations further comprising, monitoring for a page over the first cellular network connection during a paging occasion, the paging occasion configured by the network using the temporary identifier.

DETAILED DESCRIPTION

Figure 1:
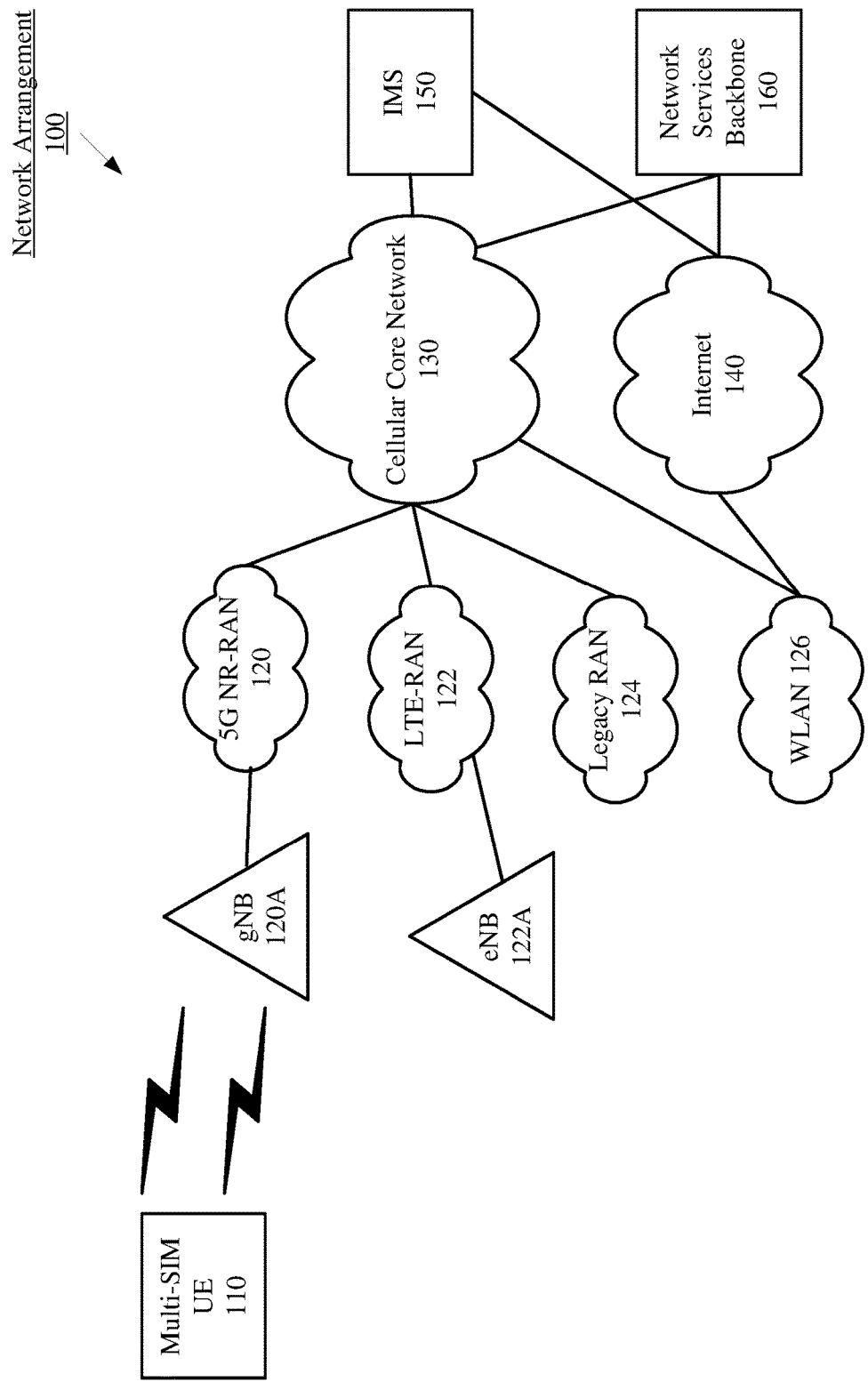
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments describe devices, systems and methods for implementing a mechanism configured to mitigate the performance degradation associated with a paging occasion collision. As will be described below, the exemplary embodiments may relate to a user equipment (UE) equipped with multiple subscriber identification modules (SIMs) and configured to cause the network to change one or more paging occasions corresponding to the UE.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

Throughout this description, the UE is characterized as a multi-SIM UE. The term "multi-SIM UE" may refer to a UE equipped with multiple SIMs. Each SIM may be used to establish an independent network connection and each network connection may exist simultaneously. Thus, each SIM may be associated with its own telephone number and/or subscription with a cellular service provider. Accordingly, a single UE may be associated with two or more telephone numbers and/or subscriptions. Throughout this description, for the purposes of differentiating between SIMs, reference will be made to SIM A and SIM B. However, this is only intended to differentiate between the two SIMs and is not intended to indicate any sort of priority/preference between either SIM A or SIM B.

A person of ordinary skill in the art would understand that a SIM contains information that is used by the UE to establish a network connection. For example, the SIM may include an international mobile subscriber identifier (IMSI) that may be used for authentication with the network provider. A user may have a first subscription with a cellular service provider that is enabled by SIM A and a second subscription with the cellular service provider that is enabled by SIM B. In one example, the same cellular service provider is associated with both SIM A and SIM B. In another example, a different cellular service provider is associated with each SIM. Reference to any particular type of information being included in a SIM is merely provided for illustrative purposes. A SIM may include a wide variety of different types of information that different networks or entities may refer to by different names. Accordingly, the exemplary embodiments may apply to a SIM that contains any type of information used by the multi-SIM UE to establish a network connection.

The exemplary embodiments will be described with respect to a multi-SIM UE equipped with two SIMs, e.g., SIM A and SIM B. However, those skilled in the art will understand that the exemplary embodiments may also apply to devices that have more than two SIMs.

The multi-SIM UE may utilize the same hardware, software and/or firmware components to perform operations related to the network connection associated with SIM A and the network connection associated with SIM B. For example, the multi-SIM UE may be configured to use the same transceiver to perform operations related to both network connections. Using the same component to perform operations for both network connections may create a scenario in which the multi-SIM UE is unable to perform an operation related to the network connection associated with one of SIM A or SIM B because the multi-SIM UE is currently using that component to perform an operation related to the network connection associated with the other SIM.

During operation, the multi-SIM UE may be configured with a first paging cycle for the first network connection and a second paging cycle for the second network connection. The first paging cycle may include paging occasions that overlap in time with the paging occasions of the second paging cycle. Those skilled in the art will understand that a paging occasion refers to an instance in which the multi-SIM UE is configured to monitor a communication channel for a page from the network.

The multi-SIM UE may be configured to use the same components to monitor the first paging occasion and the second paging occasion. As a result, when the paging occasions overlap in time, the multi-SIM UE may be unable to monitor the first paging occasion and the second paging occasion at the same time. This may interfere with network services because this may cause the subscription associated with one SIM of the multi-SIM UE to miss a page from the network. To provide an example, the multi-SIM UE may miss one or more pages related to an incoming voice call and thus, the user of the multi-SIM UE may not be provided with an opportunity to answer the incoming call. Paging is not limited to voice calls and may be used by a variety of different types of network services. Therefore, missing a page from the network may negatively impact a variety of different services and create a poor user experience for the corresponding subscription.

The exemplary embodiments relate to a multi-SIM UE configured to detect a paging occasion collision (e.g., when two or more paging occasions overlap in time) and implement a mechanism configured to mitigate the performance degradation associated with the paging occasion collision. In one aspect, a mitigation technique may include the multi-SIM UE sending signal to the network that includes information that is to be utilized by the network to update one or more paging occasions corresponding to the multi-SIM UE. In a second aspect, a mitigation technique may include the multi-SIM UE initiating a procedure that may cause the network to update one or more paging occasions corresponding to the multi-SIM UE. Throughout this description reference to the network performing an operation may refer to an operation performed at a base station, at a radio access network (RAN), at a core network, at a network function, at a network services backbone, at a network server, any other type of network component or any combination thereof.

FIG. 1 shows a network arrangement 100 according to the exemplary embodiments. The network arrangement 100 includes a multi-SIM UE 110 that includes at least two SIMs. Those skilled in the art will understand that the multi-SIM UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single multi-SIM UE 110 is only provided for illustrative purposes.

The multi-SIM UE 110 may communicate with one or more networks. In the example of the network configuration 100, the networks with which the multi-SIM UE 110 may wirelessly communicate are a 5G New Radio (NR) radio access network (5G NR-RAN) 120, an LTE radio access network (LTE-RAN) 122, a legacy access network (legacy RAN) and wireless local access network (WLAN) 126. However, the multi-SIM UE 110 may also communicate with other types of networks and the multi-SIM UE 110 may also communicate with networks over a wired connection. Therefore, the multi-SIM UE 110 may include a 5G NR chipset to communicate with the 5G NR-RAN 120, an LTE chipset to communicate with the LTE-RAN 122, a legacy chipset to communicate with the legacy RAN 124 and an ISM chipset to communicate with the WLAN 126.

The multi-SIM UE 110 may establish multiple independent network connections that may exist simultaneously. For example, the multi-SIM UE 110 may establish a first network connection using SIM A and a second network connection with a network using SIM B. The first network connection and the second network connection may be independent from one another and exist simultaneously. In the example of the network configuration 100, the multi-SIM UE 110 is camped on the gNB 120A for both the first and second network connections. However, this is merely provided for illustrative purposes. For example, the multi-SIM UE 110 may establish a first network connection to the 5G NR-RAN 120 via the gNB 120A and a second network connection to the LTE-RAN 122 via the eNB 122A. In another example, the multi-SIM UE 110 may establish a first network connection to the 5G NR-RAN 120 via the gNB 120A and a second network connection to the legacy RAN 124 via a corresponding base station (not pictured). Thus, in an actual network arrangement, the multi-SIM UE 110 may camp on a first cell corresponding to a first network for the first network connection and a second cell corresponding to a second network for the second network connection.

The 5G NR-RAN 120, the LTE-RAN 122 and the legacy RAN 124 may be portions of cellular networks that may be deployed by cellular providers (e.g., Verizon, AT&T, Sprint, T-Mobile, etc.). These networks 120, 122, 124 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The base stations (e.g., the gNB 120A, the eNB 122A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to paging. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the multi-SIM UE 110 to connect to the 5G NR-RAN 120, the LTE-RAN 122 and the legacy RAN 124. To provide an example, the 5G NR-RAN 120 may be associated with a particular cellular service provider where the multi-SIM UE 110 and/or the user thereof has a contract and credential information (e.g., stored on each of SIM A and SIM B). In the case of the multi-SIM UE 110, each SIM will independently connect to the corresponding network. Upon detecting the presence of the 5G NR-RAN 120, the multi-SIM UE 110 may transmit the corresponding credential information to associate with the 5G NR-RAN 120. More specifically, the multi-SIM UE 110 may associate with a specific cell (e.g., the gNB 120A of the 5G NR-RAN 120). Similar association procedures may be performed for the multi-SIM UE 110 to connect to the LTE-RAN 122 and the legacy RAN 124.

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the multi-SIM UE 110 using the IP protocol. The IMS 150 may communicate with the cellular core network 130 and the Internet 140 to provide the multimedia services to the multi-SIM UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the multi-SIM UE 110 in communication with the various networks.

Figure 2:
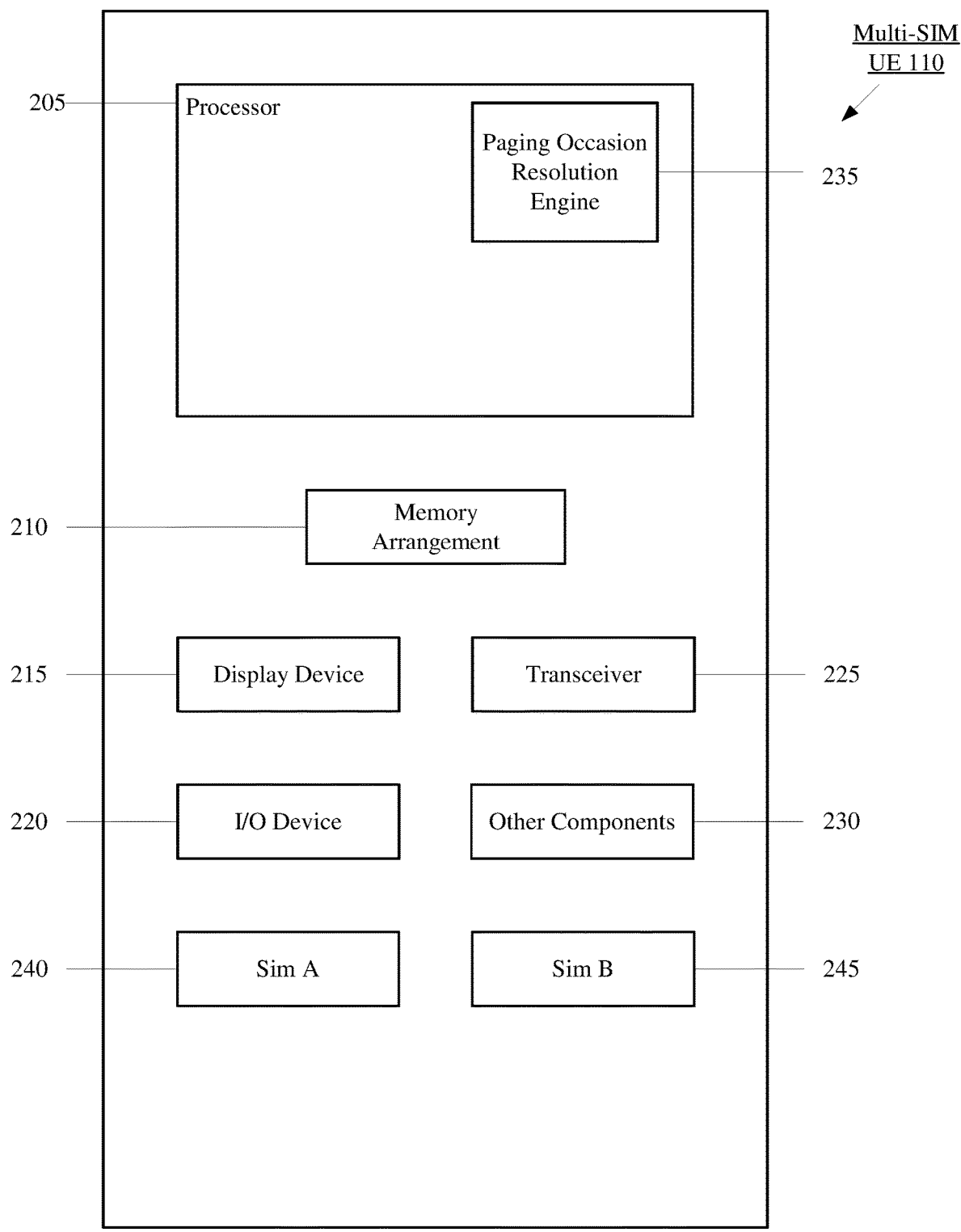
FIG. 2 shows an exemplary multi-SIM UE according to various exemplary embodiments described herein.

FIG. 2 shows an exemplary multi-SIM UE 110 according to various exemplary embodiments. The multi-SIM UE 110 will be described with regard to the network arrangement 100 of FIG. 1. The multi-SIM UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the multi-SIM UE 110 to other electronic devices, sensors to detect conditions of the UE 110, etc. The multi-SIM UE 110 may include SIM A 240 and a SIM B 245. However, as mentioned above, the exemplary embodiments may apply to a UE equipped with more than two SIMs.

The processor 205 may be configured to execute a plurality of engines for the multi-SIM UE 110. For example, the engines may include a paging occasion collision resolution engine 235. The paging occasion collision resolution engine 235 may perform operations related to detecting a paging occasion collision and triggering the network to adjust one or more paging occasions associated with the multi-SIM UE 110. Examples of these operations will be described in greater detail below.

The above referenced engine being an application (e.g., a program) executed by the processor 205 is only exemplary. The functionality associated with the engine may also be represented as a separate incorporated component of the multi-SIM UE 110 or may be a modular component coupled to the multi-SIM UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the multi-SIM UE 110. As will be described in further detail below, the memory 210 may store data associated with the conditions of the multi-SIM UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the LTE-RAN 122, the legacy RAN 124 and the WLAN 126, etc. Accordingly, the transceiver 225 may operate on a variety of different frequencies or channels (e.g., set of consecutive frequencies).

When camped on a cell of a network, the multi-SIM UE 110 may be configured with a discontinuous reception (DRX) cycle. Those skilled in the art would understand that the DRX cycle may be used in order to reduce power consumption. The DRX cycle may include a duration of time during which the multi-SIM UE 110 is configured to listen for communications from the currently camped cell. The DRX cycle may also include a duration of time during which the multi-SIM UE 110 has the opportunity to sleep and save power.

During the DRX cycle, the multi-SIM UE 110 may be configured with a paging occasion. The paging occasion may include a duration of time during which the multi-SIM UE 110 is configured to listen to a communication channel (e.g., physical downlink control channel (PDCCH), etc.) for a page sent to the multi-SIM UE 110 by the network. The paging occasion may be included in a paging frame. The paging frame may refer to a radio frame that includes one or more paging occasions. Each network connection may be configured with its own DRX cycle. Thus, the multi-SIM UE 110 may be configured with a first DRX cycle (including one or more paging occasions) for the first network connection which may be associated with SIM A 240 and a second DRX cycle (including one or more paging occasions) for the second network connection which may be associated with SIM B 245.

As indicated above, the multi-SIM UE 110 may be unable to monitor a paging occasion associated with one of the network connections while the multi-SIM UE 110 is monitoring the paging occasion associated with another network connection. When paging occasions collide in this manner (e.g., overlap in time), network services may be negatively impacted. Under conventional circumstances, a UE is not configured with the ability to resolve paging collisions. The exemplary embodiments relate to implementing a mechanism at the multi-SIM UE 110 that is configured to mitigate the performance degradation associated with paging occasion collisions.

In some networks, the network may determine a page frame for the multi-SIM UE 110 based on the following formula:

$$\text{SFN mod } T = (T \text{ div } N)*(\text{UE\_ID mod } N)$$

Here, SFN represents a system frame number which relates to a position in the time domain, T represents a UE DRX cycle parameter, N represents min(T, nB) where nB is selected as one of 4T, 2T, T, T/2, T/4, T/8, T/16, T/32, T/64, T/128, T/256, T/512 or T/1024. The UE_ID may be related to the IMSI of the multi-SIM UE 110.

Further, the network may determine a paging occasion based on the following formula: i_s=floor(UE_ID/N)mod Ns Here, i_s represents an index of the paging occasion and Ns represents max(1, nB/T). Thus, the parameter nB may be utilized by the network to determine both the paging frame and the paging occasion.

When the network configures the paging occasion and paging frame using parameters similar in form or function to the parameters described above, the multi-SIM UE 110 may be configured to implement the mitigation technique described below with regard to the signaling diagram 300.

Figure 3:
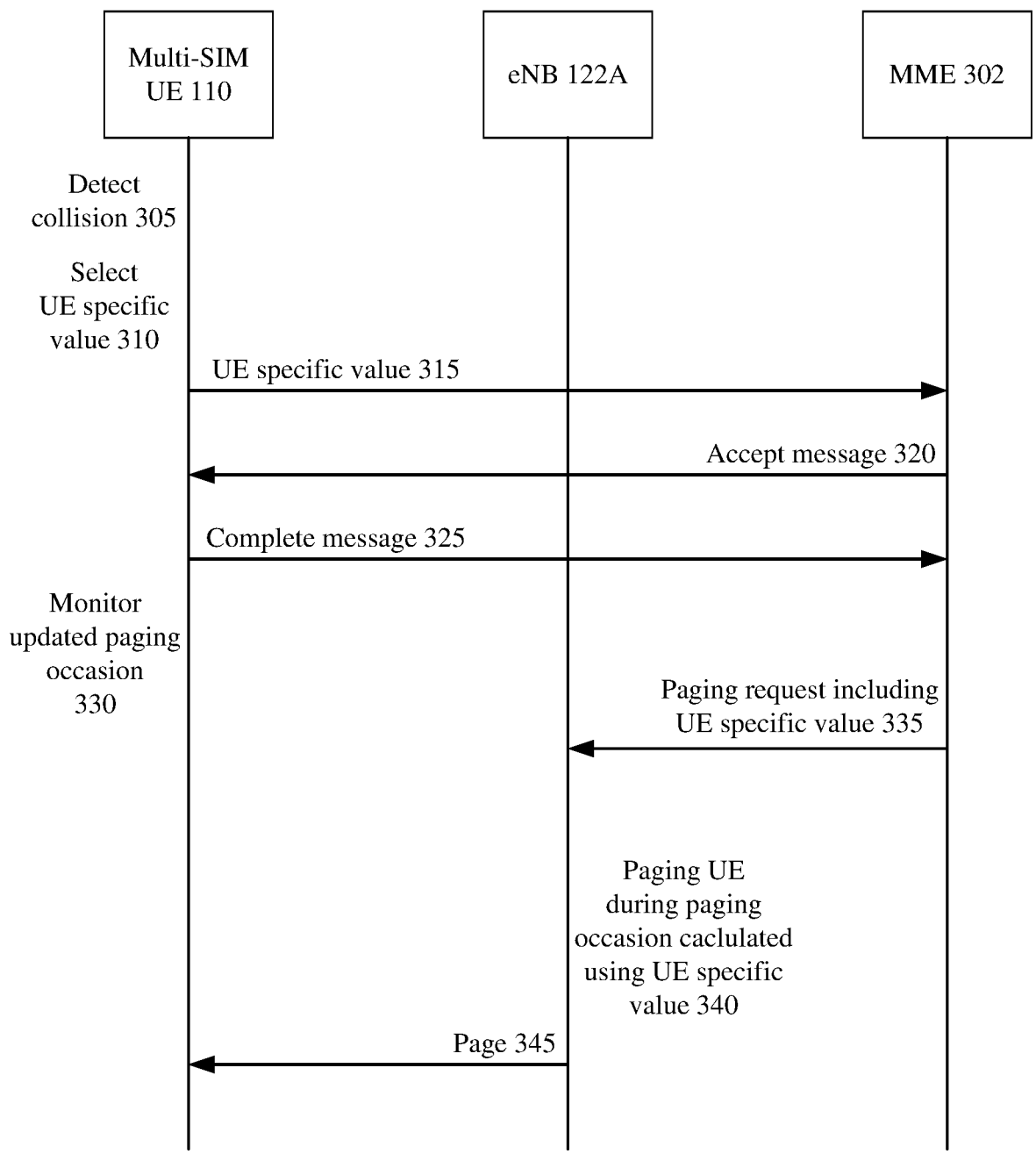
FIG. 3 shows a signaling diagram for paging occasion collision resolution accord to various exemplary embodiments.

FIG. 3 shows a signaling diagram 300 for paging occasion collision resolution accord to various exemplary embodiments. The signaling diagram 300 will be described with regard to the network arrangement 100 of FIG. 1 and the multi-SIM UE 110 of FIG. 2.

The signaling diagram 300 includes the multi-SIM UE 110, the eNB 122A and a mobile management entity (MME) 302. Those skilled in the art will understand that the MME 302 may be a network component included in the LTE-RAN 122 and/or the cellular core network 130.

Initially, consider an exemplary scenario in which the multi-sim UE 110 has established a first network connection using SIM A 240 and a second network connection using SIM B 245. As least one of the first network connection or the second network connection may be established via the eNB 122A.

In 305, the multi-SIM UE 110 detects a paging occasion collision. For example, the multi-SIM UE 110 may identify that a paging occasion associated with the first network connection and a paging occasion associated with the second network connection overlap in time. While the exemplary embodiments are described with regard to a paging occasion collision, a similar determination may be made on the basis of paging frames. For example, the multi-SIM UE 110 may identify that a paging frame associated with the first network connection and a paging frame associated with the second network connection may overlap in time. Thus, the multi-SIM UE 110 may detect a collision based on one or more paging occasions and/or one or more paging frames.

The multi-SIM UE 110 may detect a paging collision based on any of a variety of different sources. For example, the paging occasion collision resolution engine 235 may receive an indication from a protocol stack layer (e.g., non-access stratum (NAS), etc.) that a paging occasion and/or paging frame associated with the first network connection and a paging occasion and/or paging frame associated with the second network connection are scheduled to overlap in time. During operation, the NAS may receive an indication from the access stratum regarding the collision. Thus, both the NAS and the AS layers may be used to detect the collision. However, this example is only provided for illustrative purposes and the multi-SIM UE 110 may detect a paging occasion collision based on any appropriate basis.

In 310, the multi-SIM UE 110 may select a value for a parameter that is to be used by the network to determine a paging occasion and/or a paging frame associated with one of the multi-SIM UE 110 network connections. For example, the multi-SIM UE 110 may select a value for the parameter nB. Throughout this description, a value for the parameter nB that is selected by the multi-SIM UE 110 may be referred to as a UE specific nB value. In the exemplary signaling diagram 300, the UE specific nB value is described as corresponding to the first network connection. However, this is only for illustrative purposes, the multi-SIM UE 110 may select a UE specific nB value for any network connection (e.g., the first network connection, the second network connection).

In 315, the multi-SIM UE 110 sends a signal to the network that includes the UE specific nB value. For example, in various procedures such as an attach procedure, a tracking area update (TAU), a routing area update (RAU), etc., the multi-SIM UE 110 may send a DRX parameter to the MME 302. The DRX parameter may indicate whether the multi-SIM UE 110 supports DRX capabilities. The multi-SIM UE 110 may include an information element (IE) in the DRX parameter that corresponds to the UE specific nB value.

In some embodiments, the multi-SIM UE 110 may initiate a procedure that includes a DRX parameter (e.g., a tracking area update (TAU), a routing area update (RAU), etc.) in response to detecting a collision. In other embodiments, the multi-SIM UE 110 may send the UE specific nB value within a different type of message or may send the UE specific nB value in a message explicitly configured for the UE specific nB value. Alternatively, the multi-SIM UE 110 may wait until a procedure that includes DRX parameter is triggered in the conventional manner to send the UE specific nB value.

In 320, the MME 302 may send a message to the multi-SIM UE 110 that indicates that the network has utilized the UE specific nB value to determine a paging occasion and/or paging frame for the multi-SIM UE 110. For example, the MME 302 may send an attach accept message in response to an attach request that included the UE specific nB value, a TAU accept message in response to a TAU request that included the UE specific nB value and a RAU accept message in a RAU request that included the UE specific nB value. Thus, the DRX cycle corresponding to the first network connection may be configured to include a paging occasion and/or paging frame that is based on the UE specific nB value. In 325, the multi-SIM UE 110 may transmit a message to the MME 302 indicating that the procedure for updating the paging occasion and/or paging frame is complete.

In 330, the multi-SIM UE 110 may monitor the paging occasion and/or paging frame determined based on the UE specific nB value. Thus, the multi-SIM UE 110 may monitor the new paging occasion corresponding to the first network connection at a first time and the paging occasion corresponding to the second network connection at a second time that is different than the first time.

In 335, the MME 302 may send a paging request to the eNB 122A. The paging request may indicate to the eNB 122A that the eNB 122A is to send a page to the multi-SIM UE 110 over the first network connection. The paging request may include an IE for the UE specific nB value.

In 340, the eNB 122A determines that a page is to be sent to the multi-SIM UE 110 based on the paging request. The IE for the UE specific nB value in the paging request may indicate to the eNB 122A that the eNB 122A is to override the network nB value included in the PDCCH-Config parameter using the UE specific nB value. Thus, the eNB 122A may calculate the paging frame and/or paging occasion specifically for the multi-SIM UE 110 by using the UE specific nB value.

As mentioned above, the network may select nB from one of 4T, 2T, T, T/2, T/4, T/8, T/16, T/32, T/64, T/128, T/256, T/512 or T/1024. In addition to these choices, in light of the exemplary embodiments described herein, the nB may also now also be based on the UE specific nB value provided to the network by the multi-SIM UE 110.

In 345, the eNB 122A sends a page to the multi-SIM UE 110. The page may be sent to the multi-SIM UE 110 during the paging frame and/or paging occasion calculated by the eNB 122A using the UE specific nB value. Thus, the paging frame and/or paging occasion for the first network connection has been changed based on the UE specific nB value. The paging frame and/or paging occasion for the second network connection may utilize the network selected nB value. Thus, the collision has been resolved because the paging occasion and/or paging frame corresponding to the first network connection and the paging occasion corresponding to the second network connection no longer overlap in time.

In some networks, the paging occasion and/or the paging frame may be determined by the network based on a temporary mobile subscriber identity (TMSI) associated with the multi-SIM UE 110. For example, the SFN for a paging frame may be determined by the following formula: (SFN+Pf_offset) mod T=(T div N)*(UE_ID mod N)

Here, SFN represents a system frame number which relates to a position in the time domain, T represents a UE DRX cycle parameter, N represents number of total paging frames in T, Pf_offset is an offset used for paging frame determination and UE_ID may be related to the TMSI of the multi-SIM UE 110 (e.g., 5G short TMSI (5G-S-TMSI)).

Further, the network may determine a paging occasion based on the following formula: i_s=floor(UE_ID/N)mod Ns Here, i_s represents an index of the paging occasion and Ns represents number of paging occasions for a paging frame. Thus, the UE_ID may influence the calculation for both the paging frame and the paging occasion.

When the network configures the paging occasion and paging frame using parameters similar in form or function to the parameters described above, the multi-SIM UE 110 may be configured to implement the mitigation technique described below with regard to the signaling diagram 400.

Figure 4:
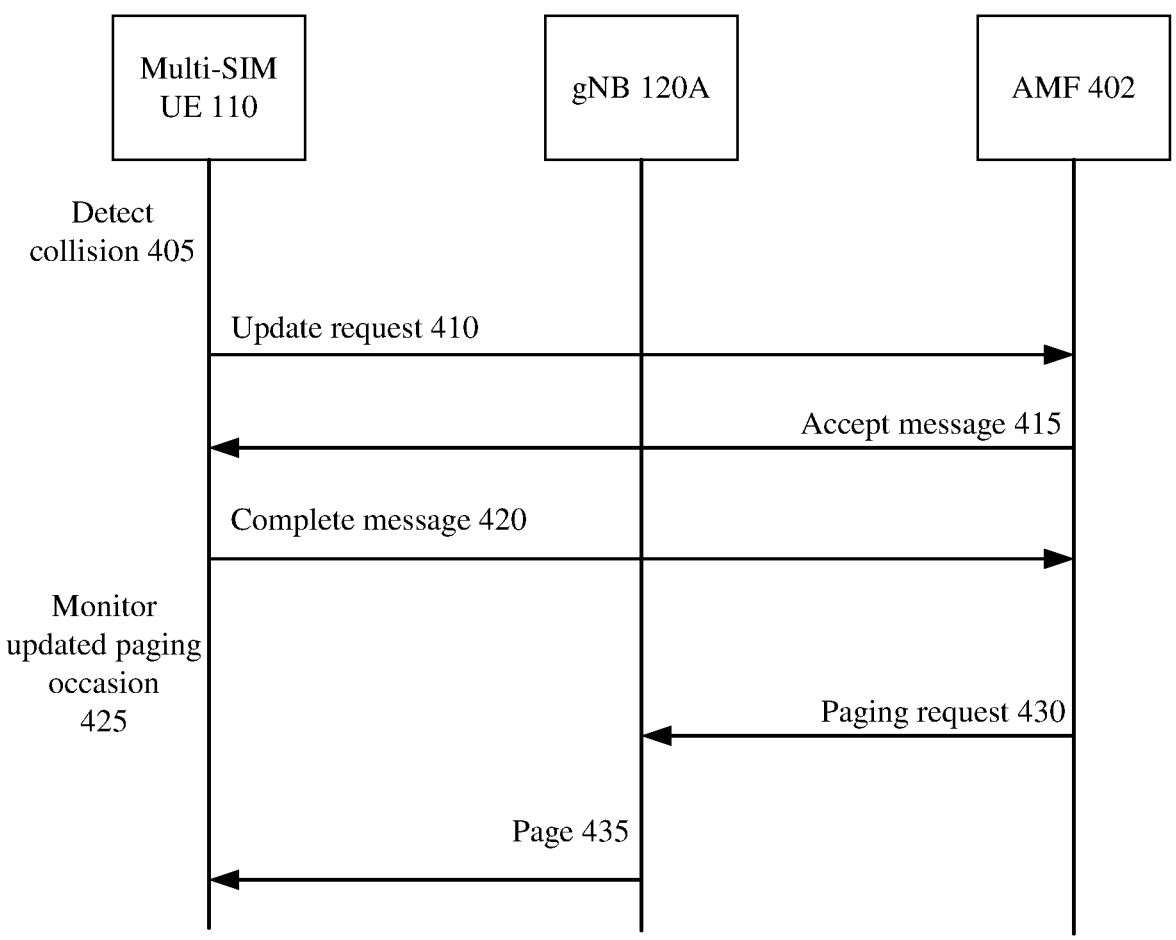
FIG. 4 shows a signaling diagram for paging occasion collision resolution accord to various exemplary embodiments.

FIG. 4 shows a signaling diagram 400 for paging occasion collision resolution accord to various exemplary embodiments. The signaling diagram 400 will be described with regard to the network arrangement 100 of FIG. 1 and the multi-SIM UE 110 of FIG. 2.

The signaling diagram 400 includes the multi-SIM UE 110, the gNB 120A and an access and mobility management function (AMF) 402. Those skilled in the art will understand that the AMF 402 may be a network component included in the 5G NR-RAN 120 and/or the cellular core network 130.

Initially, consider an exemplary scenario in which the multi-sim UE 110 has established a first network connection using SIM A 240 and a second network connection using SIM B 245. As least one of the first network connection and the second network connection is established via the gNB 120A.

In 405, the multi-SIM UE 110 detects a paging occasion collision. For example, the multi-SIM UE 110 may identify that a paging occasion associated with the first network connection and a paging occasion associated with the second network connection overlap in time. While the exemplary embodiments are described with regard to a paging occasion collision, a similar determination may be made on the basis of paging frames. For example, the multi-SIM UE 110 may identify that a paging frame associated with the first network connection and a paging frame associated with the second network connection may overlap in time. Thus, the multi-SIM UE 110 may detect a paging collision based one or more paging occasions and/or one or more paging frames.

The multi-SIM UE 110 may detect the collision based on any of a variety of different sources. For example, the paging occasion collision resolution engine 235 may receive an indication from the one or more of the lower layers of the protocol stack that a paging occasion and/or paging frame associated with the first network connection and a paging occasion and/or paging frame associated with the second network connection are scheduled to overlap in time. However, this example is only provided for illustrative purposes and the multi-SIM UE 110 may detect a collision based on any appropriate basis.

In 410, the multi-SIM UE 110 may initiate a procedure that causes the network to update a TMSI (e.g., 5G-S-TMSI) associated with the multi-SIM UE 110. For example, the multi-SIM UE 110 may send a request to the AMF 402. The request may be for one of an initial registration procedure, a periodic registration update, a registration procedure for mobility or any other appropriate procedure. Thus, the multi-SIM UE 110 may leverage one of these procedures to cause the network to update the 5G-S-TMSI corresponding to the multi-SIM UE 110. As a result, the paging frame and/or occasion for the corresponding network connection may be updated based on the new 5G-S-TMSI. Thus, the paging occasion and/or paging frame for the corresponding network connection may no longer overlap in time with the paging occasion and/or paging frame for the other network connection.

In the exemplary signaling diagram 400, the updated TMSI is described as corresponding to the first network connection. However, this is only for illustrative purposes, the multi-SIM UE 110 may initiate this procedure over either network connection (e.g., the first network connection, the second network connection).

In 415, the AMF 402 may send the multi-SIM UE 110 a message indicating that the procedure initiated in 410 has been accepted. For example, the network may send the multi-SIM UE 110 a registration accept message in response to the request sent in 410. In some embodiments, the accept message may also indicate to the multi-SIM UE 110 that a new frame and/or paging occasion has been configured for the first network connection of the multi-SIM UE 110. In other embodiments, the accept message may also indicate that a new TMSI (e.g., 5G-S-TMSI) has been assigned to the multi-SIM UE 110. Subsequently, the multi-SIM UE 110 may calculate the paging frame and paging occasion using the TMSI received in 415. In 420, the multi-SIM UE 110 may send a message to the AMF 402 indicating that the procedure is complete.

In 425, the multi-SIM UE 110 monitors the updated paging occasion for the first network connection. On the network side, in 430, the AMF 402 may send a paging request to the gNB 120A indicating that a network page is to be sent to multi-SIM UE 110. In 435, the gNB 120A may send a page to the multi-SIM UE 110 during the configured paging occasion for the first network connection. Thus, the paging occasion collision has been resolved because the paging occasion and/or paging frame corresponding to the first network connection has been updated and no longer overlaps in time with the paging occasion and/or paging frame corresponding to the second network connection.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) comprising a first subscriber identification module (SIM) and a second SIM, wherein the UE is configured to establish a first cellular network connection based on, at least, the first SIM and a second cellular network connection based on, at least, the second SIM:
   detecting a collision between i) multiple paging occasions or ii) multiple paging frames;
   selecting a narrowband (nB) parameter that is to be used by a network to determine a paging occasion for the first cellular network connection;
   transmitting a routing area update (RAU) request to the network in response to detecting the collision, the RAU request indicating a value for the nB parameter; and
   monitoring for a page over the first cellular network connection during the paging occasion.

2. The method of claim 1, wherein the nB parameter is also to be used by the network to determine a paging frame for the first cellular network connection.

3. The method of claim 1, further comprising:
   receiving an accept message from the network in response to the RAU request.

4. The method of claim 1, further comprising:
   receiving a page from a currently camped cell over the first cellular network connection, wherein the currently camped cell transmits the page to the UE during the paging occasion.

5. The method of claim 1, wherein detecting the collision is based on receiving an indication from a non-access stratum (NAS) layer.

6. The method of claim 1, wherein a paging frame is determined based on SFN mode $T=(T \text{ div } N)*(UE\_ID \text{ mode } N)$ where SFN represents a system frame number, T represents a UE discontinuous reception (DRX) cycle parameter, UE_ID represents an international mobile subscriber identifier (IMSI) of the UE and N represents min (T, nB) where a value for the nB parameter is selected from one of multiple predetermined values.

7. The method of claim 6, wherein the value for the nB parameter is selected as one of 4T, 2T, T, T/2, T/4, T/8, T/16, T/32, T/64, T/128, T/256, T/512 or T/1024.

8. A user equipment (UE), comprising:
   a first subscriber identification module (SIM);
   a second SIM;
   a transceiver configured to establish a first cellular network connection based on, at least, the first SIM and a second cellular network connection based on, at least, the second SIM; and
   a processor configured to perform operations, the operations comprising:
   detecting a collision between i) multiple paging occasions or ii) multiple paging frames;

selecting a narrowband (nB) parameter that is to be used by a network to determine a paging occasion for the first cellular network connection;

transmitting a routing area update (RAU) request to the network in response to detecting the collision, the RAU request indicating a value for the nB parameter; and monitoring for a page over the first cellular network connection during the paging occasion.

9. The UE of claim 8, wherein the nB parameter is also to be used by the network to determine a paging frame for the first cellular network connection.

10. The UE of claim 8, the operations further comprising:
receiving an accept message from the network in response to the RAU request.

11. The UE of claim 8, wherein detecting the collision is based on receiving an indication from a non-access stratum (NAS) layer.

12. The UE of claim 8, wherein the operations further comprise:
receiving a page from a currently camped cell over the first cellular network connection, wherein the currently camped cell transmits the page to the UE during the paging occasion.

13. The UE of claim 8, wherein a paging frame is determined based on SFN mode T=(T div N)*(UE_ID mode N) where SFN represents a system frame number, T represents a UE discontinuous reception (DRX) cycle parameter, UE_ID represents an international mobile subscriber identifier (IMSI) of the UE and N represents min (T, nB) where a value for the nB parameter is selected from one of multiple predetermined values.

14. The UE of claim 13, wherein the value for the nB parameter is selected as one of 4T, 2T, T, T/2, T/4, T/8, T/16, T/32, T/64, T/128, T/256, T/512 or T/1024.

* * * * *